(12) United States Patent
Erdman et al.

(10) Patent No.: US 9,829,655 B2
(45) Date of Patent: Nov. 28, 2017

(54) COMMUNICATION CONNECTOR HAVING AN ALIGNMENT MECHANISM

(75) Inventors: David Donald Erdman, Hummelstown, PA (US); Alan E. Plotts, Harrisburg, PA (US)

(73) Assignee: TE Connectivity Corporation, Berwyn, PA (US)

( * ) Notice: Subject to any disclaimer, the term of this patent is extended or adjusted under 35 U.S.C. 154(b) by 1500 days.

(21) Appl. No.: 13/348,872

(22) Filed: Jan. 12, 2012

(65) Prior Publication Data

US 2013/0183000 A1    Jul. 18, 2013

(51) Int. Cl.
*G02B 6/38* (2006.01)
*H01R 13/62* (2006.01)
*H01R 13/64* (2006.01)

(52) U.S. Cl.
CPC ....... *G02B 6/3886* (2013.01); *H01R 13/6205* (2013.01); *H01R 13/64* (2013.01)

(58) Field of Classification Search
CPC .................................................. G02B 6/3886
See application file for complete search history.

(56) References Cited

U.S. PATENT DOCUMENTS

| | | | | |
|---|---|---|---|---|
| 4,078,709 | A | * | 3/1978 | Jenkins ................ G11B 15/103 226/180 |
| 4,690,495 | A | * | 9/1987 | Giannini ......................... 385/57 |
| 4,718,745 | A | | 1/1988 | Strait |
| 4,844,582 | A | * | 7/1989 | Giannini .............. G02B 6/3817 385/57 |
| 5,829,987 | A | | 11/1998 | Fritsch et al. |
| 6,004,045 | A | | 12/1999 | Snackers et al. |
| 6,922,496 | B2 | | 7/2005 | Morris |
| 6,975,514 | B2 | | 12/2005 | Morris |
| 7,118,285 | B2 | | 10/2006 | Fenwick et al. |
| 7,229,218 | B2 | | 6/2007 | Morris et al. |
| 7,251,388 | B2 | | 7/2007 | Morris et al. |
| 7,344,315 | B2 | | 3/2008 | Fenwick et al. |
| 7,813,613 | B2 | | 10/2010 | Fenwick et al. |
| 7,983,519 | B2 | | 7/2011 | Kamins et al. |
| 2007/0072442 | A1 | | 3/2007 | DiFonzo et al. |

(Continued)

FOREIGN PATENT DOCUMENTS

| | | |
|---|---|---|
| CN | 1185237 A | 6/1998 |
| CN | 101640323 A | 2/2010 |

(Continued)

OTHER PUBLICATIONS

International Search Report, International Application No. PCT/US2013/021489, International Filing Date Jan. 14, 2013.

(Continued)

*Primary Examiner* — Sung Pak
*Assistant Examiner* — Hoang Tran

(57) ABSTRACT

A communication connector including a connector housing configured to hold at least one of optical fibers or electrical contacts. The connector housing has an engagement face that is configured to interface with a mating connector. The communication connector also includes a movable member that is held by the connector housing and that includes a magnetic material. The movable member is permitted to move toward and engage the mating connector when the movable member is magnetically drawn toward the mating connector.

20 Claims, 5 Drawing Sheets

(56) References Cited

U.S. PATENT DOCUMENTS

| | | | |
|---|---|---|---|
| 2008/0310852 A1 | 12/2008 | Tan et al. | |
| 2009/0190892 A1 | 7/2009 | Kamins et al. | |
| 2009/0246425 A1 | 10/2009 | Tong et al. | |
| 2009/0274467 A1 | 11/2009 | Morris et al. | |
| 2010/0027941 A1 | 2/2010 | Stewart et al. | |
| 2010/0028018 A1 | 2/2010 | Tan et al. | |
| 2011/0171837 A1* | 7/2011 | Hardisty et al. | 439/39 |

FOREIGN PATENT DOCUMENTS

| | | |
|---|---|---|
| CN | 201466331 U | 5/2010 |
| CN | 101950904 A | 1/2011 |
| CN | 102064415 A | 5/2011 |
| DE | 19512335 C1 | 8/1996 |
| WO | WO 2009/136899 | 11/2009 |
| WO | WO 2010/050981 | 5/2010 |
| WO | 2010088695 A1 | 8/2010 |
| WO | WO 2010/088695 A1 | 8/2010 |
| WO | WO 2010/126492 | 11/2010 |

OTHER PUBLICATIONS

Chinese Office Action dated Dec. 3, 2015 for Chinese application 201380011301.8 with English translation.

\* cited by examiner

COMMUNICATION CONNECTOR HAVING AN ALIGNMENT MECHANISM

BACKGROUND OF THE INVENTION

The subject matter described and/or illustrated herein relates generally to a communication connector having a mechanism for aligning with another connector.

Communication systems can include an electrical or optical connector that is configured to mate with another electrical or optical connector. Typically, the mateable pair of connectors have a plurality of communication terminals (or lines) in which each communication terminal must align with another communication terminal from the other connector. When the connectors are brought toward each other along a mating axis, the connectors must align with each other to assure the terminals are communicatively coupled. To this end, the connectors may include alignment features that facilitate aligning the connectors before the connectors are mated.

Alignment features typically include static, physical structures that are located on or proximate to an end of the connector. The alignment features of one connector can substantially complement the alignment features of the other connector. For example, a first connector may have an engagement face with one or more guide pins that project away from the engagement face along the mating axis. The second connector may have a mating face including one or more sleeves with cavities that are configured to receive the guide pins of the first connector. When the first and second connectors are moved toward each other along a mating axis, the guide pins are inserted into the cavities of the sleeves. If the first and second connectors are not aligned, the guide posts engage walls of the sleeve that redirect the connector(s).

Although such alignment mechanisms can function well when the first and second connectors face and approach each other along a mating axis, the guide pin/sleeve combination may present problems when the first connector approaches the second connector from the side (i.e., along a plane that is transverse to the mating axis). For example, if a connector having the guide pins approached another connector from the side, the guide pins could catch the other connector before the two connectors are aligned. This could damage one or both of the connectors. The guide pin/sleeve combination may also require at least one of the first and second connectors to move a relatively large amount (e.g., 2.0 mm or more) along the mating axis to mate the first and second connectors. A greater amount of movement along the mating axis can be undesirable in some instances. In addition to the above challenges, guide pins can be small in diameter and, as such, the alignment mechanism would only correct a limited amount of misalignment between the two connectors.

Accordingly, there is a need for a communication connector having an alignment mechanism that permits mating from the side and/or that allows greater amounts of misalignment than known alignment mechanisms.

BRIEF DESCRIPTION OF THE INVENTION

In one embodiment, a communication connector is provided that includes a connector housing configured to hold at least one of optical fibers or electrical contacts. The connector housing has an engagement face that is configured to interface with a mating connector. The communication connector also includes a movable member that is held by the connector housing and that includes a magnetic material. The movable member is permitted to move toward and engage the mating connector when the movable member is magnetically drawn toward the mating connector.

Optionally, the connector housing can include a housing cavity with a cavity opening. The movable member can be held within the housing cavity. The movable member moves within the housing cavity toward the mating connector when the movable member is magnetically drawn. In some embodiments, the movable member is permitted to move at least partially through the cavity opening when the movable member engages the mating connector. Optionally, the communication connector can include more than one movable member and more than one housing cavity.

In another embodiment, a connector assembly is provided that includes first and second communication connectors configured to mate with each other. The first communication connector has an engagement face and a movable member. The second communication connector has a mating face that interfaces with the engagement face of the first communication connector. The second communication connector includes a coupling magnet and a member recess that opens to the mating face. The movable member is permitted to move at least partially into the member recess when the first and second communication connectors are aligned and the movable member is magnetically drawn toward the coupling magnet.

In another embodiment, a communication connector configured to mate with another connector is provided. The communication connector includes a connector body having a mating face that is configured to interface with an engagement face of the other connector. The communication connector also includes a member recess that opens to the mating face and is configured to receive a movable member therein of the other connector. The communication connector also includes a coupling magnet that is held by the connector body. The coupling magnet is positioned behind the member recess such that the member recess is located between the coupling magnet and the other connector when the other connector and the communication connector are mated. The coupling magnet is configured to magnetically draw the movable member into the member recess.

DETAILED DESCRIPTION OF THE INVENTION

Figure 1:
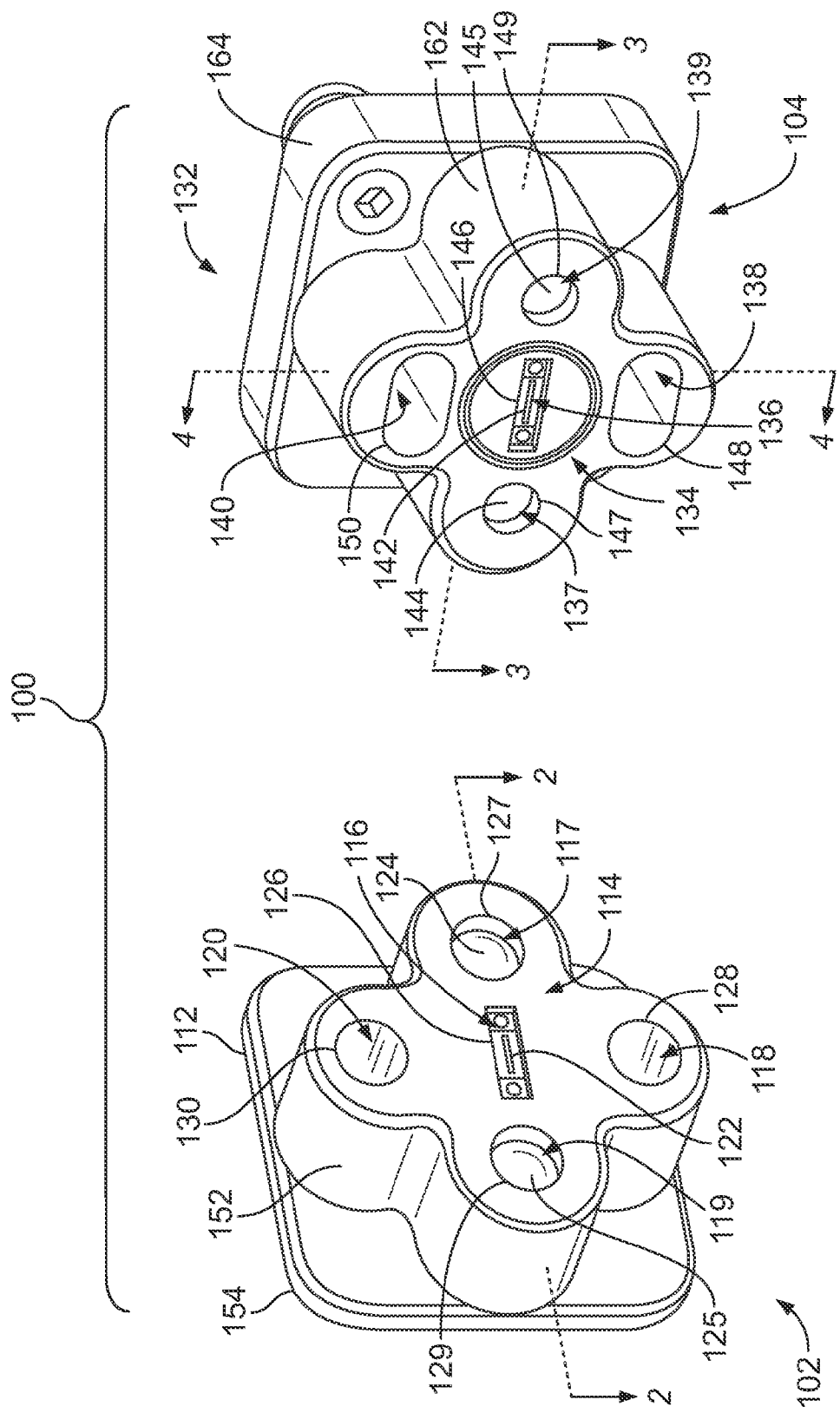
FIG. 1 illustrates a connector assembly formed in accordance with one embodiment having first and second communication connectors.

FIG. 1 illustrates isolated perspective views of a first communication connector 102 and a second communication connector 104 that together constitute a connector assembly 100 formed in accordance with one embodiment. The second communication connector 104 may also be referred to as a mating connector. In an exemplary embodiment, the communication connectors 102, 104 are optical connectors. In some embodiments, the communication connector 104 is configured to be attached to a chassis 274 (shown in FIG. 5) of a blade server system, and the communication connector 102 is configured to be attached to a card module 272 (shown in FIG. 5) that is inserted into the server system. As will be described in greater detail below, the communication connectors 102, 104 include magnetic alignment mechanisms that are used to align the communication connectors 102, 104 during a coupling operation.

It should be noted that FIG. 1 is only exemplary and that the communication connectors 102, 104 may have other configurations and/or may be part of various other types of components, systems, and assemblies in other embodiments. In another configuration, the communication connector 104 may be part of the card module 272, and the communication connector 102 may be attached to the chassis 274. In other embodiments, the communication connectors 102, 104 are not optical connectors, but electrical connectors. As another example of an alternative embodiment, either or both of the communication connectors 102, 104 may be attached to cables instead of the chassis 274 or the card module 272. The communication connectors 102, 104 could also be used with communication devices other than a card module.

Moreover, the connector assembly 100 is not limited to a particular mating or loading operation. For example, in an exemplary embodiment, the communication connectors 102, 104 are side-loaded in which one of the communication connectors slides or wipes across the other communication connector. Alternatively, the communication connectors 102, 104 can face and approach each other along a mating axis.

As shown in FIG. 1, the communication connector 102 includes a connector housing 112 having an engagement face 114 that is configured to interface with the communication connector 104. The connector housing 112 has a plurality of housing cavities 116-120 having respective cavities openings 126-130. The engagement face 114 includes the cavity openings 126-130. The communication connector 102 also includes a communication module 122 and a plurality of movable members 124, 125. The communication module 122 is located within the housing cavity 116, and the movable members 124, 125 are located within the housing cavities 117, 119. The connector housing 112 includes a non-magnetic material(s). The movable members 124, 125 include a magnetic material (i.e., a material that is attracted to magnets). In an exemplary embodiment, the movable members 124, 125 are not magnetized in that the movable members 124, 125 do not create operative magnetic fields. However, the movable members 124, 125 may be magnetized in alternative embodiments. The magnetic material may include a ferromagnetic material, such as iron, nickel, cobalt, an alloy thereof (e.g., steel), and the like. In some embodiments, the movable members 124, 125 consist essentially of the ferromagnetic material.

Figure 5:
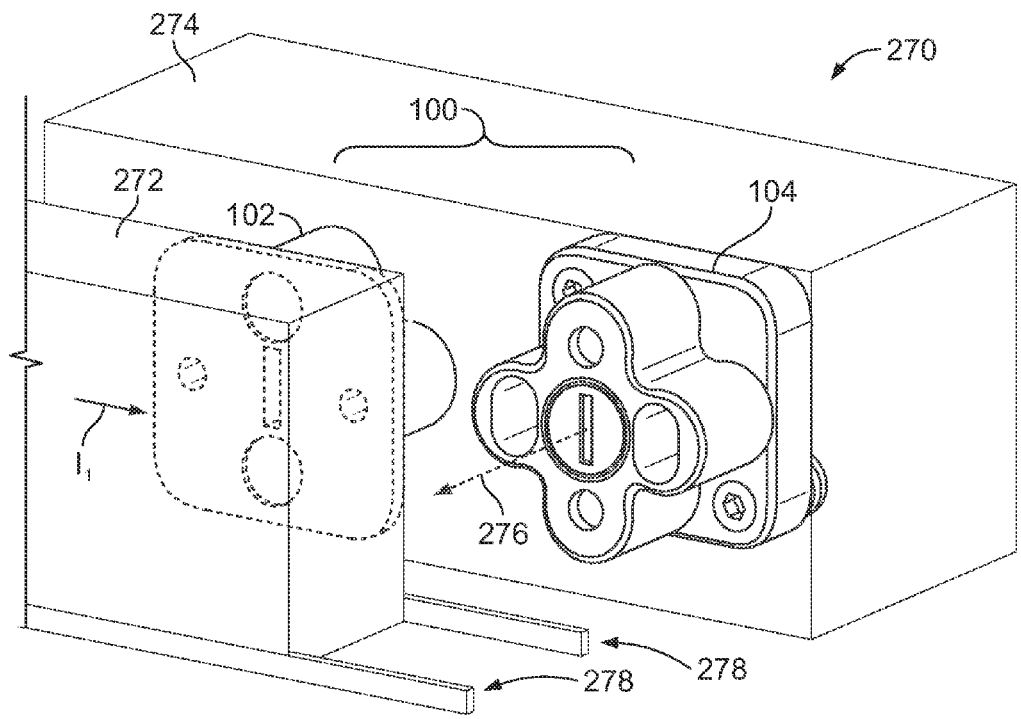
FIG. 5 shows a portion of a communication system in accordance with one embodiment that includes the first and second communication connectors.

As shown, the connector housing 112 may include a connecting portion 152 and a panel portion 154. The connecting portion 152 projects away from the panel portion 154 and includes the housing cavities 116-120. The panel portion 154 is configured to be mounted to another element, such as the card module 272 (FIG. 5). The housing cavities 118, 120 may be configured to hold fasteners (not shown) or other hardware for coupling the connector housing 112 to the card module 272. In the illustrated embodiment, the connector housing 112 comprises a single piece of molded dielectric material. However, in other embodiments, the connector housing 112 may be constructed from multiple parts. For example, the connecting and panel portions 152, 154 can be separately molded elements that are coupled together.

Also shown in FIG. 1, the communication connector 104 includes a connector body 132 having a mating face 134 that is configured to interface with the communication connector 102. The connector body 132 has a plurality of body cavities 136-140 having respective body openings 146-150. The mating face 134 includes the body openings 146-150. The communication connector 104 also includes a communication module 142 and a plurality of coupling magnets 144, 145. The communication module 142 is located within the body cavity 136, and the coupling magnets 144, 145 are located within the body cavities 137, 139, respectively. In some embodiments, the coupling magnets 144, 145 are permanent magnets having respective magnetic fields configured to magnetically draw other magnetic materials. In other embodiments, the coupling magnets 144, 145 could be electromagnets. The connector body 132 may include non-magnetic material(s).

As shown, the connector body 132 includes a floatable portion 162 and a base portion 164. The floatable portion 162 is movably coupled to the base portion 164 and includes the body cavities 136-140. The base portion 164 is configured to be mounted to another element, such as the chassis 274 (FIG. 5). In the illustrated embodiment, the floatable portion 162 and the base portion 164 are fabricated from non-magnetic material(s). For example, the floatable and base portions 162, 164 can be separately molded from a dielectric material and coupled together such that the floatable and base portions 162, 164 are movable with respect to each other. Alternatively, the connector body 132 is a single integral structure that does not have a floatable component.

Figure 2:
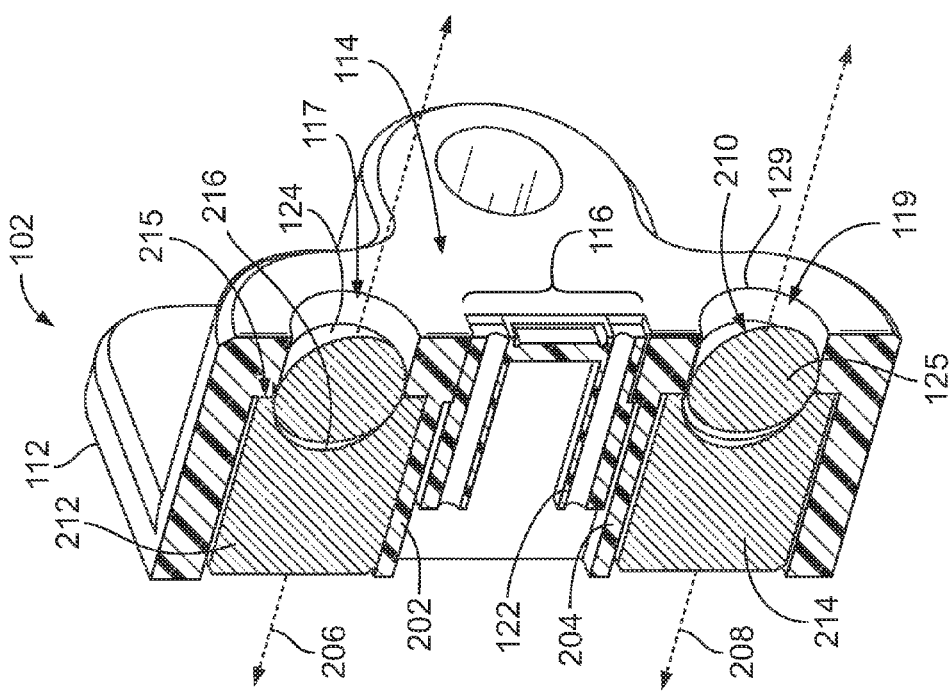
FIG. 2 shows a cross-section of the first communication connector in FIG. 1.

FIG. 2 shows a cross-section of the first communication connector 102 taken along the line 2-2 in FIG. 1. The cross-section is taken along a plane that extends through the housing cavities 116, 117, 119. In an exemplary embodiment, the module 122 is an optical module. Although not shown, the module 122 may include an array of optical fibers ends and a corresponding lens array that is configured to collect, collimate, and project light from the optical fiber ends. However, the module 122 can be other types of optical modules or the module 122 can be an electrical module having one or more electrical contacts. Although only a single module 122 is shown in FIG. 2, a plurality of modules 122 may be positioned within the housing cavity 116. For example, the modules 122 may be stacked adjacent to each other within the housing cavity 116. It should also be noted that embodiments described herein are not required to hold distinct communication modules. Instead, the connector housing 112 may directly hold optical fibers or electrical conductors from a cable.

The connector housing 112 is configured to hold the module 122 in a fixed position within the housing cavity 116. As such, the housing cavity 116 can be dimensioned such that interior surfaces that define the housing cavity 116 form an interference fit with the module 122. In the illustrated embodiment, the module 122 is positioned proximate to and directly between the housing cavities 117, 119. The connector housing 112 has a pair of interior walls 202, 204 that separate the housing cavity 116 from the housing cavities 117, 119, respectively. Thus, the module 122 is held proximate to and directly between the movable members 124, 125. In other embodiments, the module 122 may have other positions relative to the movable members 124, 125.

The housing cavity 117 and the movable member 124 may be sized and shaped relative to each other to permit the movable member 124 to move within the housing cavity 117. Likewise, the housing cavity 119 and the movable member 125 may be sized and shaped relative to each other to permit the movable member 125 to move within the housing cavity 119. In particular embodiments, the movable members 124, 125 are spheres. However, the movable members 124, 125 may have any shape provided that the movable members 124, 125 are capable of moving within the respective housing cavities 117, 119. As shown, the movable members 124, 125 are configured to move along respective cavity axes 206, 208.

The movable members 124, 125 are configured to engage the communication connector 104 (FIG. 1). With respect to just the movable member 125, the movable member 125 may have a coupling portion 210 that is configured to move at least partially through the cavity opening 129 and clear the engagement face 114 to engage the communication connector 104. Because the movable member 125 is spherical and may roll/rotate within the housing cavity 119, it should be understood that the coupling portion 210 is that portion of the movable member 125 that ultimately clears the engagement face 114 and engages the communication connector 104. Thus, when the movable member 125 is located within the housing cavity 119 as shown in FIG. 2, the coupling portion 210 may or may not face the communication connector 104 due to the spherical shape of the movable member 125. More specifically, when the movable member 125 is a sphere, any portion of the sphere may ultimately be the coupling portion 210.

Whether the movable member 125 is spherical or not, a contour of the coupling portion 210 may facilitate aligning the communication connectors 102, 104 during a coupling operation. For example, the coupling portion 210 may have a cross-section taken perpendicular to the cavity axis 208 that reduces or diminishes in size as the coupling portion 210 extends toward the communication connector 104. In the illustrated embodiment, the coupling portion 210 has a curved contour due to the spherical shape. The coupling portion 210 could also have a curved contour that is dome-shaped. In other embodiments, the coupling portion 210 may be substantially cone-shaped or pyramid-shaped. However, in alternative embodiments, the coupling portion 210 does not have a diminishing cross-section. For example, the movable member 125 may be a cylindrical pin.

The above description of the coupling portion 210 was with specific reference to the movable member 125. However, the movable member 124 may also have a coupling portion that is similar to the coupling portion 210.

Also shown in FIG. 2, the first communication connector 102 may include base members 212, 214. The base member 212 is located behind the movable member 124 such that the movable member 124 is located between the base member 212 and an exterior of the communication connector 102. In a similar manner, the base member 214 is located behind the movable member 125 such that the movable member 125 is located between the base member 214 and the exterior of the communication connector 102. The base member 212 is aligned with the movable member 124 along the cavity axis 206, and the base member 214 is aligned with the movable member 125 along the cavity axis 208.

The base members 212, 214 include a magnetic material. For example, the base members 212, 214 may include a ferromagnetic material, such as iron, nickel, cobalt, an alloy thereof (e.g., steel), and the like. In some embodiments, the base members 212, 214 consist essentially of the ferromagnetic material. The base members 212, 214 and the movable members 124, 125 may be manufactured from the same material, such as steel. However, the base members 212, 214 and the movable members 124, 125 are not required to be manufactured from the same material. For instance, the base members 212, 214 could comprise a magnetic material that is more attracted to magnets than the material used to manufacture the movable members 124, 125.

The base members 212, 214 have disc-like or cylindrical structures in FIG. 2, but the base members 212, 214 may have different structures in other embodiments. With specific reference to the base member 212, the base member 212 has a leading end 215 proximate to the engagement face 114 and the movable member 124. In an exemplary embodiment, the leading end 215 includes an end recess 216 that is sized to receive at least a portion of the movable member 124. The end recess 216 may be concave and substantially complement a shape of the spherical movable member 124. However, the leading end 215 may be shaped in other manners. For example, if the movable member 124 has a different shape, the leading end 215 may also have a different shape that substantially complements the alternative movable member 124. However, the leading end 215 is not required to complement the movable member 124. For example, the leading end 215 may not include the end recess 216.

The above description of the leading end 215 was with specific reference to the base member 212. However, the base member 214 may also have a leading end that is similar the leading end 215.

Figure 3:
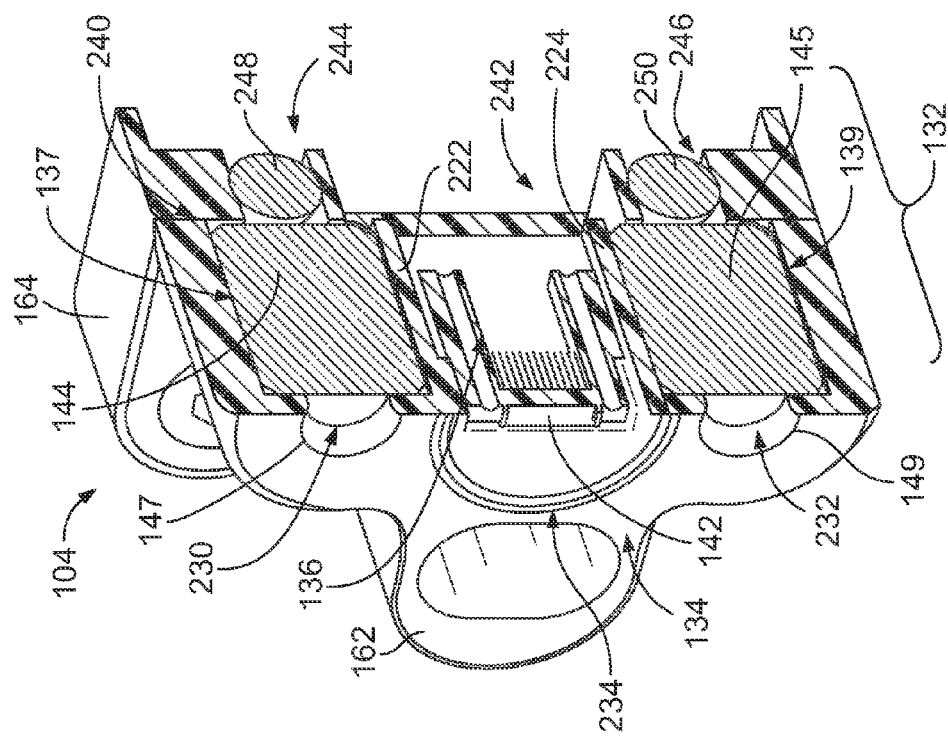
FIG. 3 shows a cross-section of the second communication connector in FIG. 1.

FIG. 3 shows a cross-section of the second communication connector 104 taken along the line 3-3 in FIG. 1. The cross-section extends through the body cavities 136, 137, and 139. The module 142 is configured to communicatively engage the module 122 (FIG. 1). Similar to the module 122, the module 142 may include an array of optical fibers ends and a corresponding lens array that is configured to collect, collimate, and project light from the optical fiber ends. However, like the module 122, the module 142 can be other types of optical modules or the module 142 can be an electrical module having one or more electrical contacts.

The connector body 132 is configured to hold the module 142 in a fixed position within the body cavity 136. The body cavity 136 can be dimensioned such that interior surfaces that define the body cavity 136 form an interference fit with the module 142. In the illustrated embodiment, the module 142 is positioned proximate to and directly between the body cavities 137, 139. The connector body 132 may include a pair of interior walls 222, 224 that separate the body cavity 136 from the body cavities 137, 139, respectively.

As shown in FIG. 3, the coupling magnets 144, 145 are held within the body cavities 137, 139, respectively. The coupling magnets 144, 145 are secured or affixed to the connector body 132 and may be located proximate to the body openings 147, 149. The body opening 147 and the coupling magnet 144 may define a member recess 230, the body opening 149 and the coupling magnet 145 may define a member recess 232. The coupling magnets 144, 145 are exposed to an exterior of the communication connector 104 through the body openings 147, 149. However, the coupling magnets 144, 145 may not be exposed in other embodiments.

When the mating face 134 and the engagement face 114 are engaged, unwanted particles (e.g., dust, dirt, and the like) may exist between the mating and engagement faces 134, 114. Optionally, the mating face 134 can include at least one wiping feature 234. The wiping feature 234 includes one or more physical structures that interface with the engagement face 114. The physical structures can extend toward or away from the engagement face 114. When the mating and engagement faces 134, 114 engage each other, the wiping feature 234 can remove or collect the unwanted particles. In the illustrated embodiment, the wiping feature 234 includes grooves that extend along the mating face 134. The grooves can be molded with the housing or subsequently formed into the mating face 134. Alternatively, the wiping feature 234 could project away from the mating face 134 toward the communication connector 102. The wiping feature 234 could also be distinct from the connector body 132. For example, the wiping feature 234 could be a compressible o-ring that encircles the body cavity 136 along the mating face 134.

FIG. 3 also illustrates the floatable portion 162 and the base portion 164 in greater detail. The floatable and base portions 162, 164 engage each other along an interface 240. The base portion 164 has a central opening 242 that opens to the body cavity 136 so that the module 142 and corresponding cable (not shown) can be inserted through the central opening 242 into the body cavity 136.

The base portion 164 also includes base cavities 244, 246 having set elements 248, 250 positioned therein, respectively. The set elements 248, 250 include a magnetic material such as those described above. The base cavities 244, 246 and the respective set elements 248, 250 are configured to be generally aligned with the coupling magnets 144, 145, respectively. In an exemplary embodiment, when the floatable and base portions 162, 164 are movably coupled together and the first and second communication connectors 102, 104 are not mated, the coupling magnets 144, 145 provide a magnetic force that draws the set elements 248, 250 toward the coupling magnets 144, 145 thereby holding the floatable portion 162 and the base portion 164 together. In such embodiments, the coupling magnets 144, 145 and the set elements 248, 250 operate to prevent or limit the floatable portion 162 from moving in the direction of gravity.

Figure 4:
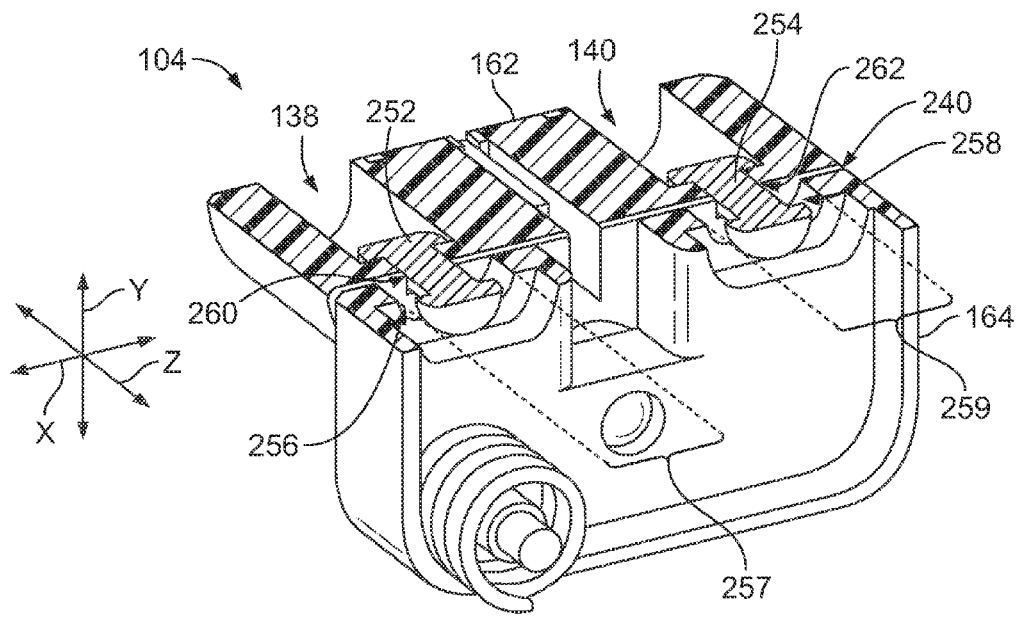
FIG. 4 illustrates another cross-section of the second communication connector.

FIG. 4 illustrates a cross-section of the communication connector 104 taken along the line 4-4 in FIG. 1. The communication connector 104 is oriented with respect to mutually perpendicular X, Y, and Z-axes. As shown, the floatable portion 162 is positioned relative to the base portion 164 such that the body cavities 138, 140 are substantially aligned with base cavities 256, 258, respectively. The communication connector 104 may include fasteners 252, 254 that extend through the body cavities 138, 140, respectively, and the interface 240. The fasteners 252, 254 may then extend into the respective base cavities 256, 258.

The base cavities 256, 258 include slot openings 257, 259, and the body cavities 138, 140 include slot openings 260, 262. The slot openings 257, 259 extend lengthwise along an X-axis, and the slot openings 260, 262 extend lengthwise along the Y-axis. The slot openings 257, 259 are dimensioned to be greater than the dimensions of the fasteners 252, 254 along the X-axis, and the slot openings 260, 262 are dimensioned to be greater than the dimensions of the fasteners 252, 254 along the Y-axis. As such, the fasteners 252, 254 are permitted to move within the slot openings 257, 259 along the X-axis, and the fasteners 252, 254 are permitted to move within the slot openings 260, 262 along the Y-axis. Accordingly, the floatable portion 162 is movably coupled to the base portion 164.

FIG. 5 shows a portion of a communication system 270 in accordance with one embodiment that utilizes the connector assembly 100. The communication system 270 may be a blade server system in which the first communication connector 102 is coupled to the card module 272 and the second communication connector 104 is coupled to system chassis 274. As shown, a mating axis 276 extends approximately through a center of the second communication connector 104. The mating axis 276 may extend parallel to the Z-axis shown in FIG. 4. The card module 272 is configured to slide along guide rails 278 of the communication system 270 in an insertion direction $I_1$ that is transverse to the mating axis 276.

In the illustrated embodiment, the first and second communication connectors 102, 104 are configured to mate with each other after a side-loading operation. In a side-loading operation, the communication connector 102 faces in a direction that is orthogonal (i.e., perpendicular) to the insertion direction $I_1$. The communication connectors 102, 104 face in opposite directions along the mating axis 276. However, during the side-loading operation, the communication connectors 102, 104 do not oppose each other and are not aligned with each other until the card module 272 has reached a predetermined point along the guide rails 278.

Although FIG. 5 illustrates a side-loading operation, the communication connectors 102, 104 can also be configured to engage each other through a face-to-face (or end mount) mating operation in which the communication connectors 102, 104 face each other and are generally aligned with each other along the mating axis 276. In this alternative configuration, the communication connector 102 faces in the same direction as the insertion direction (not shown).

Figure 6:
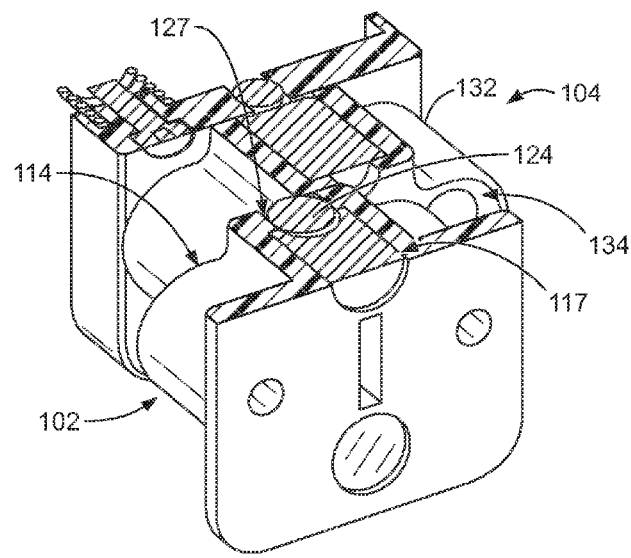
FIG. 6 is a cross-section of the first and second communication connectors engaging each other during a side-loading operation.

FIG. 6 is a cross-section of the communication connectors 102, 104 as the communication connectors 102, 104 are engaging each other during the side-loading operation shown in FIG. 5. In an exemplary embodiment, the mating face 134 of the communication connector 104 and the engagement face 114 of the communication connector 102 are substantially planar. A clearance or spacing may exist between the mating and engagement faces 134, 114 so that the communication connectors 104, 102 may move freely alongside each other. As shown in FIG. 6, if the movable member 124 extends beyond the engagement face 114, the movable member 124 may engage the connector body 132. The dimensions of the housing cavity 117 permit the movable member 124 to be pushed into the housing cavity 117 so that the communication connectors 104, 102 can move freely alongside each other. However, the movable member 124 is not required to engage the connector body 132. For example, in some embodiments, the movable member 124 may not clear the engagement surface 114 as the cavity opening 127 passes the connector body 132.

Figure 7:
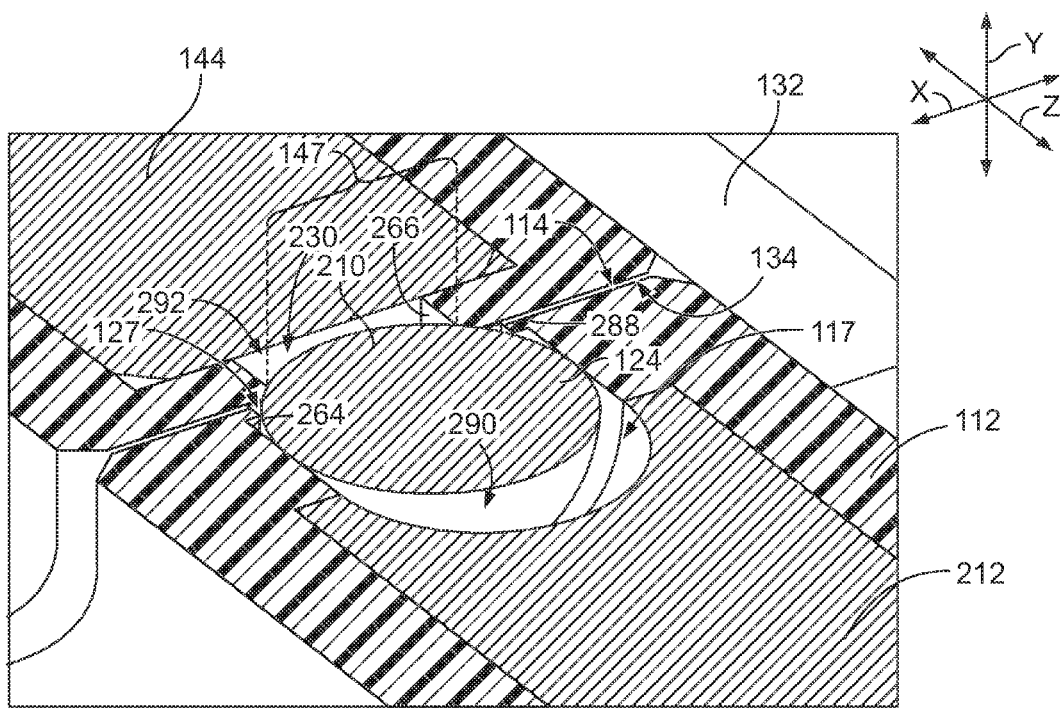
FIG. 7 is an enlarged cross-section of the first and second communication connectors mated to each other.

FIG. 7 is an enlarged cross-section of the first and second communication connectors 102, 104 (FIG. 1) mated to each other. In FIG. 7, the movable member 124, the base member 212, and the coupling magnet 144 are aligned along the cavity axis 206 (FIG. 2). The coupling magnet 144 is positioned behind the member recess 230 such that the member recess 230 is located between the coupling magnet 144 and the communication connector 102 when the communication connectors 102, 104 are mated. As the cavity opening 127 and the member recess 230 begin to align with each other, the movable member 124 is magnetically drawn by the coupling magnet 144 toward the communication connector 104 along the Z-axis. In the illustrated embodiment, the movable member 124 moves through the cavity opening 127 and clears the engagement face 114. The movable member 124 is permitted to move at least partially into the member recess 230.

The cavity opening 127 is defined by at least one peripheral wall 264 of the connector housing 112. The peripheral wall(s) 264 proximate to the engagement face 114 may be sized and shaped relative to the movable member 124 to stop the movable member 124 from moving beyond a predetermined point. For example, the peripheral wall(s) 264 may include an inwardly extending rim 288 within the housing cavity 117 along the engagement face 114. The rim 288 is configured to prevent the movable member 124 from moving beyond a predetermined point when the communication connector 102 is not engaged to the communication connector 104. The rim 288 (or the peripheral wall(s) 264) may prevent the movable member 124 from inadvertently exiting the housing cavity 117.

As shown in FIG. 7, when the communication connectors 102, 104 are engaged, the movable member 124 is separated from the base member 212 by an air gap 290 and separated from the coupling magnet 144 by an air gap 292. The body opening 147 of the member recess 230 is defined by at least one peripheral wall 266 of the connector body 132. Dimensions of the peripheral wall(s) 266 proximate to the mating face 134 (and, thus, the body opening 147) are sized and shaped relative to dimensions of the movable member 124 and, more particularly, the coupling portion 210 of the movable member 124. In an exemplary embodiment, the dimensions of the body opening 147 are configured to be smaller than the dimensions of the coupling portion 210. For example, the movable member 124 has a cross-section taken perpendicular to the cavity axis 206. At some point, the cross-section of the movable member 124 is greater than a size of the body opening 147 viewed along the cavity axis 206. At this time, the peripheral wall(s) 266 that define the body opening 147 stops the movable member 124 with the coupling portion 210 extending into the member recess 230. When the coupling portion 210 is engaged with the connector body 132 (or the peripheral wall(s) 266), the movable member 124 may prevent movement of the communication connector 102 along the X or Y axes.

Figure 8:
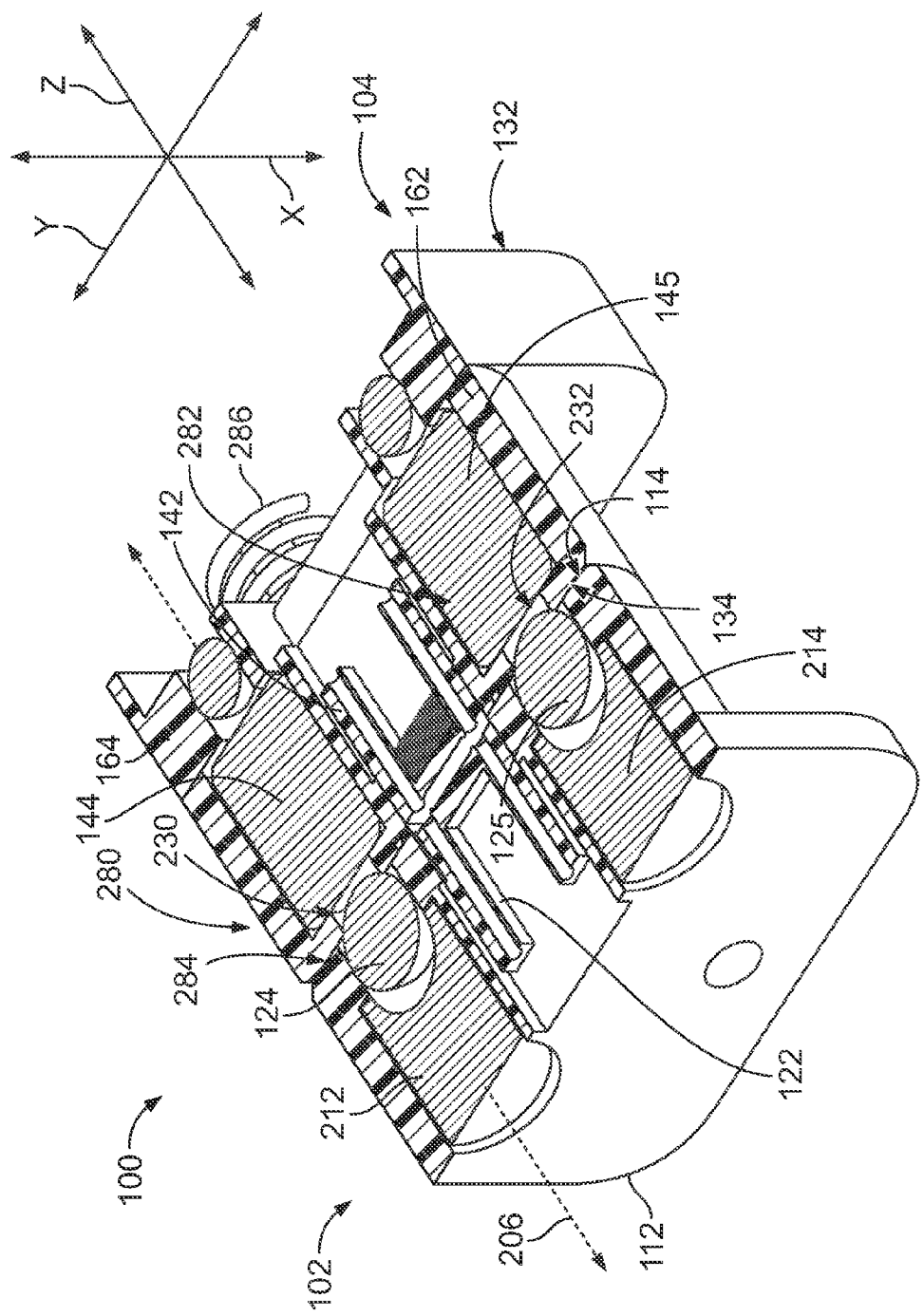
FIG. 8 is a cross-section of the first and second communication connectors mated to each other.

FIG. 8 is a cross-section of the first and second communication connectors 102, 104 mated to each other. The movable member 124, the coupling magnet 144, and the member recess 230 may define an alignment mechanism 280 of the connector assembly 100. In some cases, when only one alignment mechanism is used, such as the alignment mechanism 280, the communication connector 102 may still be rotatable about the cavity axis 206. Thus, in particular embodiments, the connector assembly 100 includes more than one alignment mechanism. For example, the movable member 125, the coupling magnet 145, and the member recess 232 may define an alignment mechanism 282. The alignment mechanisms 280, 282 are configured to prevent movement of the communication connector 102 along the XY plane. More specifically, the alignment mechanisms 280, 282 prevent linear movement in any direction along the XY plane and prevent rotational movement about any axis that is parallel to the Z-axis, such as the mating axis 276 (FIG. 5) or the cavity axis 206.

When the communication connectors 102, 104 are mated together, the modules 122, 142 are communicatively coupled such that optical signals and/or electrical signals can be communicated therebetween. In an exemplary embodiment, a small air gap exists between the optical fiber ends of the modules 122, 142. Each of the modules 122, 142 may be configured to project the optical signals across the air gap and into the other module. However, in alternative embodiments, the modules 122, 142 can be mechanically coupled together as well. In such alternative embodiments, a separate mechanism may be used for physically joining the modules 122, 142. As one example, after the communication connectors 102, 104 are properly aligned, a separate actuation mechanism can move either of the modules 122, 142 toward the other along the Z-axis.

As shown, the base members 212, 214 are held in fixed positions relative to the connector housing 112, and the coupling magnets 144, 145 are held in fixed positions relative to the connector body 132. In some embodiments, the alignment mechanisms 280, 282 not only facilitate aligning the communication connectors 102, 104, but the alignment mechanisms 280, 282 can also prevent or limit movement of the communication connectors 102, 104 away from each other. For example, with reference to just the alignment mechanism 280, the magnetic field of the coupling magnet 144 not only attracts the movable member 124, but also attracts the base member 212. When the base member 212 experiences a magnetic force provided by the coupling magnet 144, the coupling magnet 144 and the base member 212 are pulled toward each other thereby pulling the connector housing 112 and the connector body 132 toward each other. The alignment mechanism 282 is located on the other side of the modules 122, 142, but may operate in a similar manner.

Accordingly, the combined magnetic forces provided by the alignment mechanisms 280, 282 hold the engagement and mating faces 114, 134 together along an interface 284. The magnetic forces of the alignment mechanisms 280, 282 can operate to prevent the communication connectors 102, 104 from inadvertently moving away from each other along the Z-axis. Moreover, the magnetic forces may operate in conjunction with the adjoined mating surfaces 114, 134 to prevent inadvertent tilting of either of the communication connectors 102, 104 away from the other communication connector.

In some embodiments, the floatable portion 162, the base portion 164, or the connector body 132 as a whole can move toward the communication connector 102. For example, the communication connector 104 may include a spring element 286 that movably couples the communication connector 104 to the system chassis 274 (FIG. 5). When the communication connector 102 is aligned with the communication connector 104, the generated magnetic forces may move the mating face 134 toward the engagement face 114 along the Z-axis. Accordingly, the alignment mechanisms 280, 282 may also move the mating face 134 away from the system chassis 274 toward the communication connector 102. In such embodiments, the communication system 270 (FIG. 5) can be configured to have a larger clearance or gap between the mating face 134 and the engagement face 114.

In the illustrated embodiment, the communication connector 102 includes two movable members 124, 125. However, embodiments described herein may function with more than two movable members. In some cases, embodiments may be able to function with only one movable member. For example, a single magnetic alignment mechanism, as described herein, may be used in conjunction with known alignment mechanisms.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A communication connector comprising:
a connector housing configured to hold at least one of optical fibers or electrical contacts, the connector housing having an engagement face that is configured to interface with a mating connector after a coupling operation, the engagement face facing in a forward direction toward the mating connector during the coupling operation, the connector housing including a housing cavity; and
a movable member held by the connector housing within the housing cavity and comprising a magnetic material, the movable member being movable relative to the connector housing during the coupling operation, wherein the movable member is configured to be magnetically drawn in the forward direction by the mating connector during the coupling operation from a first position, in which the movable member and the mating connector are unengaged, to a second position, in which the movable member and the mating connector are engaged, the movable member being at least partially in the housing cavity in the first position, the movable member moving in the forward direction from the first position in the housing cavity to the second position when magnetically drawn during the coupling operation, the movable member being drawn out of the housing cavity when magnetically drawn to the second position.

2. The communication connector of claim 1, wherein the communication connector comprises a plurality of said movable members held by the connector housing.

3. A communication connector comprising:
a connector housing configured to hold at least one of optical fibers or electrical contacts, the connector housing having an engagement face that is configured to interface with a mating connector after a coupling operation; and
a movable member held by the connector housing and comprising a magnetic material, wherein the movable member is permitted to move, relative to the connector housing, toward and engage the mating connector when the movable member is magnetically drawn toward the mating connector;
wherein the connector housing includes a housing cavity having a cavity opening, the movable member being held within the housing cavity, the movable member permitted to move within the housing cavity toward the mating connector when the movable member is magnetically drawn during the coupling operation, the movable member moving, when magnetically drawn, toward the mating connector from a first position within the housing cavity to a second position, the movable member moving through the cavity opening out of the housing cavity when the movable member is magnetically drawn to the second position.

4. The communication connector of claim 3, wherein the movable member is permitted to clear the engagement face when the movable member engages the mating connector.

5. The communication connector of claim 3, wherein the cavity opening is sized and shaped relative to the movable member to stop the movable member from moving beyond a predetermined point.

6. The communication connector of claim 3, wherein the housing cavity and the movable member at least partially define an alignment mechanism, the communication connector including more than one of said alignment mechanism.

7. The communication connector of claim 3, further comprising a base member held by the connector housing and comprising a magnetic material, the base member pulling the connector housing toward the mating connector when the base member is magnetically drawn toward the mating connector, the movable member being movable with respect to the base member.

8. The communication connector of claim 3, further comprising a base member held by the connector housing and comprising a magnetic material, the base member pulling the connector housing toward the mating connector when the base member is magnetically drawn toward the mating connector, wherein the movable member is located between the base member and the mating connector, the movable member being movable with respect to the base member.

9. The communication connector of claim 1, wherein the movable member includes a coupling portion that clears the engagement face as the movable member moves from the first position to the second position during the coupling operation, the coupling portion having a curved contour.

10. A connector assembly comprising:
a first communication connector including a connector housing having an engagement face and a movable member that is held by the connector housing; and
a second communication connector configured to mate with the first communication connector, the second communication connector having a mating face that interfaces with the engagement face of the first communication connector, the second communication connector including a coupling magnet and a member recess that opens to the mating face, the member recess having an opening that is defined by an edge of a peripheral wall;
wherein the movable member is permitted to move relative to the connector housing of the first communication connector and at least partially into the member recess of the second communication connector when the first and second communication connectors are approximately aligned and the movable member is magnetically drawn toward the coupling magnet, the movable member being sized and shaped relative to the opening of the member recess such that the edge of the peripheral wall blocks the movable member from moving further into the member recess when the coupling magnet magnetically draws the movable member into the member recess.

11. The connector assembly of claim 10, wherein the first communication connector comprises a plurality of said movable members that are held by the connector housing.

12. The connector assembly of claim 10, further comprising a base member held by the first communication connector and comprising a magnetic material, the movable member being located between the base member and the second communication connector and movable relative to the base member, the base member pulling the first communication connector and the second communication connector together when the base member is magnetically drawn.

13. The connector assembly of claim 10, wherein the first communication connector includes a housing cavity having a cavity opening, the movable member being held within the housing cavity, the movable member clearing the cavity opening when magnetically drawn by the coupling magnet.

14. The connector assembly of claim 10, wherein the movable member includes a coupling portion that clears the engagement face and advances into the member recess, the coupling portion having a curved contour.

15. The connector assembly of claim 10, wherein the movable member includes a coupling portion that clears the engagement face and advances into the member recess, the member recess having a recess opening, wherein dimensions of the recess opening are smaller than dimensions of the coupling portion.

16. The connector assembly of claim 10, wherein the second communication connector comprises a connector body having a base portion and a floatable portion that is movably coupled to the base portion, the floatable portion having the mating face and the coupling magnet.

17. The connector assembly of claim 10, wherein the second communication connector is coupled to a system chassis and the first communication connector is coupled to a card module, the second communication connector being permitted to move toward the first communication connector.

18. The communication connector of claim 1, wherein the engagement face faces in a forward direction, the communication connector and the engagement face being shaped to move freely alongside the mating connector during a side-loading operation in which the engagement face moves in a direction that is perpendicular to the forward direction.

19. The communication connector of claim 1, wherein the engagement face engages the mating connector at an interface, the movable member being the only element of the communication connector that clears the interface.

20. The communication connector of claim 1, wherein the movable member is spherical.

* * * * *